(12) United States Patent
Chapman et al.

(10) Patent No.: US 10,702,095 B2
(45) Date of Patent: Jul. 7, 2020

(54) BOTTLE TOP LIQUID INFUSION SYSTEM

(71) Applicants: Dean Chapman, New York City, NY (US); Shane Blomberg, Brooklyn, NY (US); Ed Kilduff, New York City, NY (US); Andrew Reeves, Brooklyn, NY (US)

(72) Inventors: Dean Chapman, New York City, NY (US); Shane Blomberg, Brooklyn, NY (US); Ed Kilduff, New York City, NY (US); Andrew Reeves, Brooklyn, NY (US)

(73) Assignee: FRESHLINK PRODUCT DEVELOPMENT, LLC, New York, NY (US)

( * ) Notice: Subject to any disclaimer, the term of this patent is extended or adjusted under 35 U.S.C. 154(b) by 324 days.

(21) Appl. No.: 15/880,679

(22) Filed: Jan. 26, 2018

(65) Prior Publication Data

US 2018/0289208 A1    Oct. 11, 2018

Related U.S. Application Data

(60) Provisional application No. 62/483,002, filed on Apr. 7, 2017.

(51) Int. Cl.
*A47J 31/46*    (2006.01)
*A47J 31/00*    (2006.01)

(52) U.S. Cl.
CPC ............. *A47J 31/46* (2013.01); *A47J 31/005* (2013.01)

(58) Field of Classification Search
CPC ................................ A47J 31/46; A47J 31/005
See application file for complete search history.

(56) References Cited

U.S. PATENT DOCUMENTS 6,481,337 B1 *    11/2002    Guu    ...................... A47J 31/005
99/285

* cited by examiner

*Primary Examiner* — John C Hong
(74) *Attorney, Agent, or Firm* — Stuart M. Goldstein

(57) ABSTRACT

A liquid infusion system has an infusion chamber with open top and bottom ends. The top end has a removable cover. Flavored ingredients are placed in the chamber. A lower housing is rotatably secured to the bottom end of the chamber. A one-way valve located within the lower housing allows liquid flow in only a single direction. A stopper configured to be inserted into a bottle of virgin liquid is connected to the lower housing. When the system is tilted downward, virgin liquid is free to flow from the bottle and into the chamber. Bringing the bottle to vertical closes the valve and allows the virgin liquid and any ingredients placed in the chamber to steep, to produce a flavored infused beverage. The lower housing can be rotated and locked into a position in relation to the infusion chamber to prevent the flow of liquid into or out of the chamber.

5 Claims, 7 Drawing Sheets

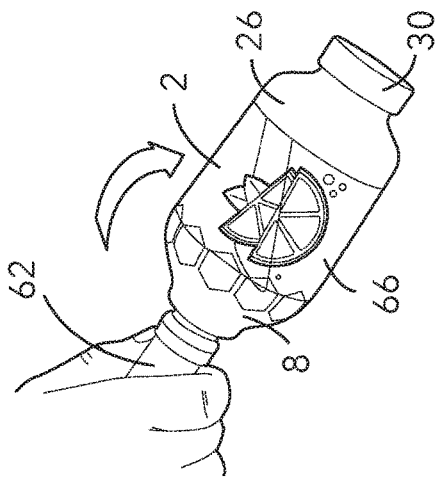
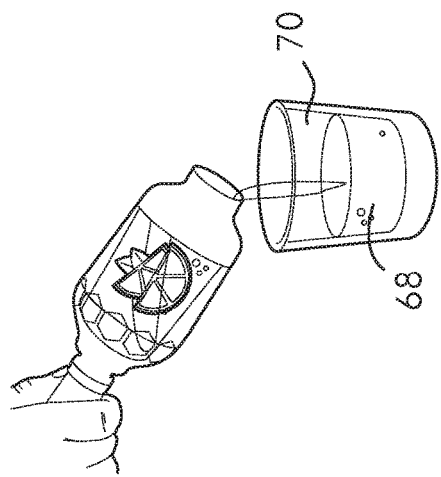
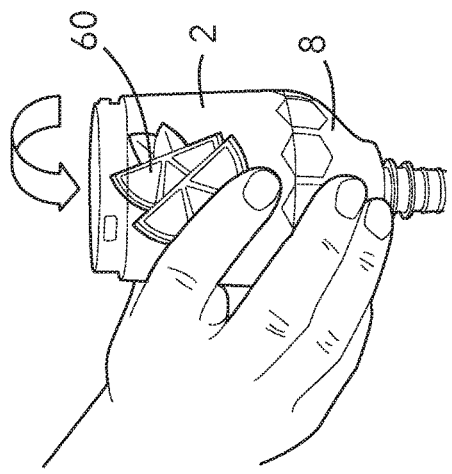
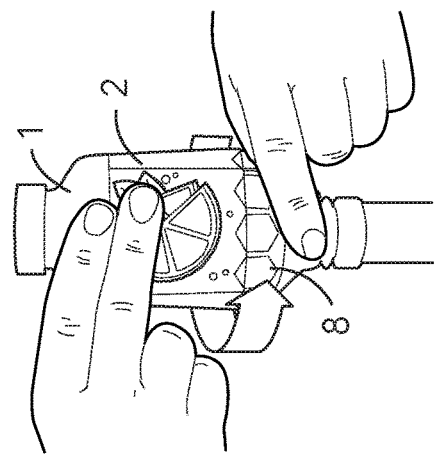
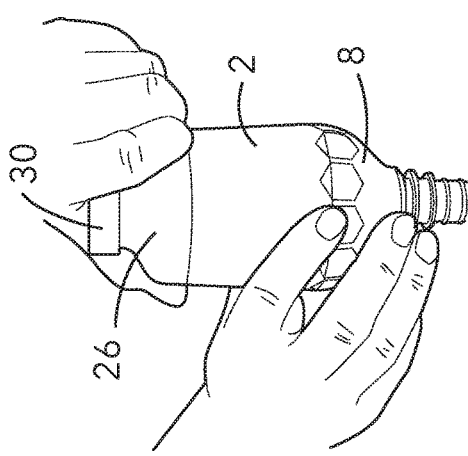
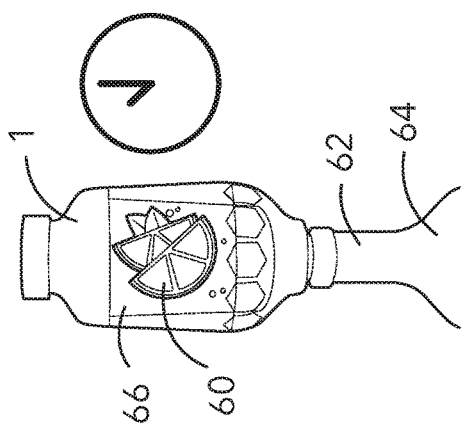

BOTTLE TOP LIQUID INFUSION SYSTEM

RELATED APPLICATION

This application claims the benefit of provisional application Ser. No. 62/483,002, filed on Apr. 7, 2017.

BACKGROUND OF THE INVENTION

Flavored liquids, containing infused fruit, vegetable, antioxidant, vitamin enriched and even liquor ingredients, have recently enjoyed increased popularity. However, such drinks are usually expensive and only offer a limited variety of flavors, flavors which are selected by the beverage manufacturers themselves. Many infused drinks are artificially flavored. Others may have flavoring which is too strong or too weak or have an unexpected, unsatisfying taste to the consumer. Since such drinks are often only sold in large quantities and once bought and opened, a bottle of a purchased infused liquid cannot be returned. The result is a waste of money and product.

There is thus a need for a liquid infusion system specifically designed for the consumer, to economically and easily mix one's own infused drink, in order to try various flavors and ingredients suited to specific tastes and preferences.

SUMMARY OF THE INVENTION

It is thus the object of the present invention to provide a bottle top liquid infusion system which produces flavored infused drinks and thus overcomes the significant limitations and disadvantages of prior infused beverages.

It is the object of the present invention to provide a liquid infusion system which allows the use of flavorings and ingredients of choice to produce infused beverages of preferred taste.

It is another object of the present invention to provide a liquid infusion system which permits the flavoring of small volumes of liquid inexpensively, before mixing larger quantities which are satisfactory to the user.

It is still another object of the present invention to provide a liquid infusion system which allows for small quantity testing and tasting, while ensuring waste is kept to a minimum.

It is a further object of the present invention to provide a liquid infusion system which allows for the inclusion of natural infusion ingredients into the beverage.

It is another object of the present invention to provide a liquid infusion system which can be utilized with most bottles of preferred virgin liquid.

It is still another object of the present invention to provide a liquid infusion system is a cost effective tool to be used as and when needed, without filling cupboards, pantries, and refrigerators with stored beverage bottles.

It is another object of the present invention to provide a liquid infusion system which allows the user to steep and infuse flavors under careful scrutiny, thus providing the ability to easily modify beverages to suit taste.

These and other objects are accomplished by the present invention, a liquid infusion system having an infusion chamber with an open top end and an open bottom end. The top end has a removable cover which provides a waterproof seal closure. Flavored ingredients are placed in the chamber. A lower housing is rotatably secured to the bottom end of the infusion chamber and a one-way valve is located within the lower housing to allow liquid flow in only a single direction. A pourer located within a stopper is connected to the lower housing. The stopper is conveniently configured to be inserted into a bottle of virgin liquid. When the housing is turned and rotated into a first position in relation to the infusion chamber and the infusion system is rotated downward, virgin liquid is free to flow in a single direction from the bottle of liquid through the pourer and stopper, through the valve, and then into the infusion chamber. Bringing the bottle back to vertical closes the valve and allows the virgin liquid and any ingredients placed in the infusion chamber to steep, thus producing the flavored infused beverage of choice. When the lower housing is turned and rotated into a second position in relation to the infusion chamber, the chamber is sealed off from the bottle to prevent the flow of liquid between the bottle and the chamber.

The novel features Which are considered as characteristic of the invention are set forth in particular in the appended claims. The invention, itself, however, both as to its design, construction and use, together with additional features and advantages thereof, are best understood upon review of the following detailed description with reference to the accompanying drawings.

BRIEF DESCRIPTION OF THE DRAWINGS

FIGS. 12-17 illustrate the use of the bottle top liquid infusion system of the present invention.

DETAILED DESCRIPTION OF THE INVENTION

Figure 1:
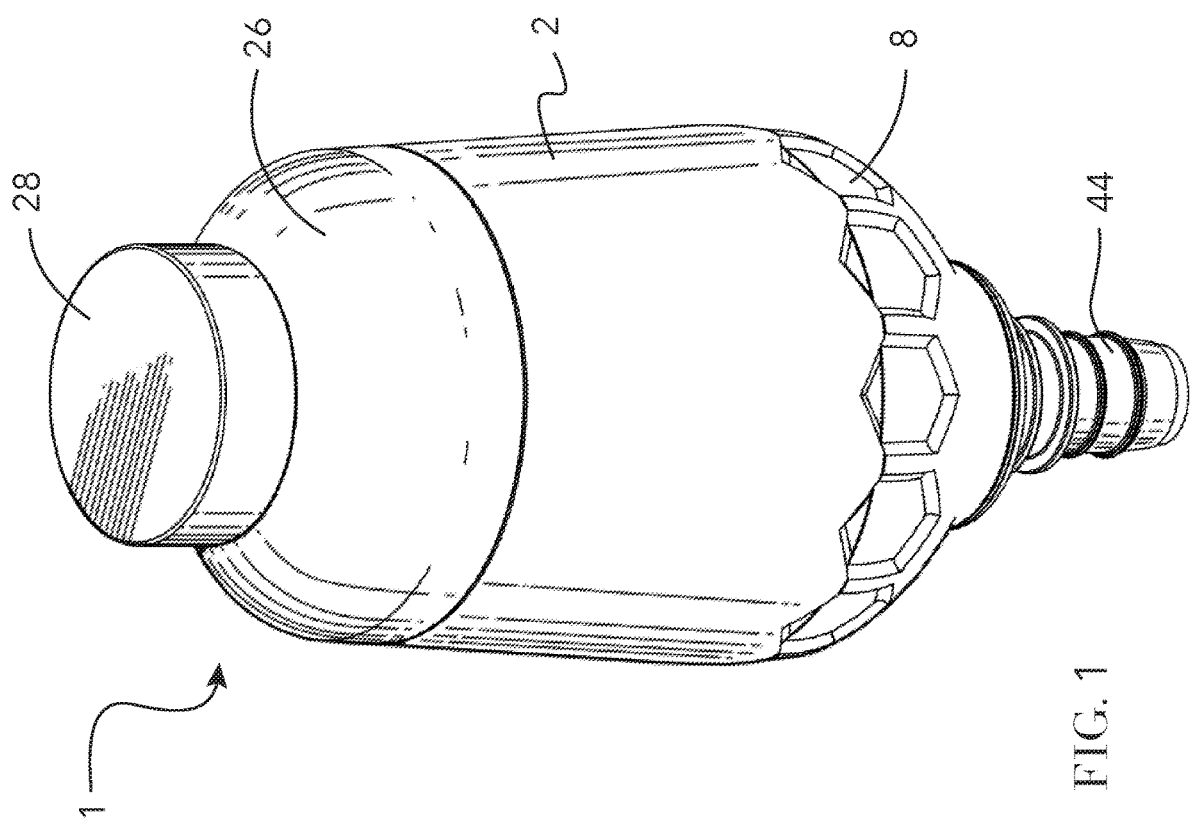
FIG. 1 is a perspective view of the bottle top liquid infusion system of the present invention.
Figure 3:
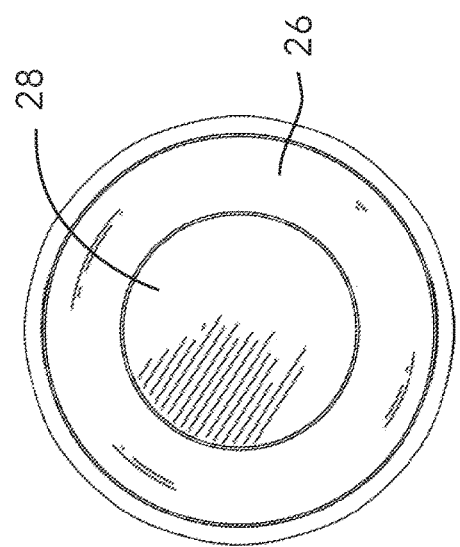
FIG. 3 is a top view of the bottle top liquid infusion system of the present invention.
Figure 4:
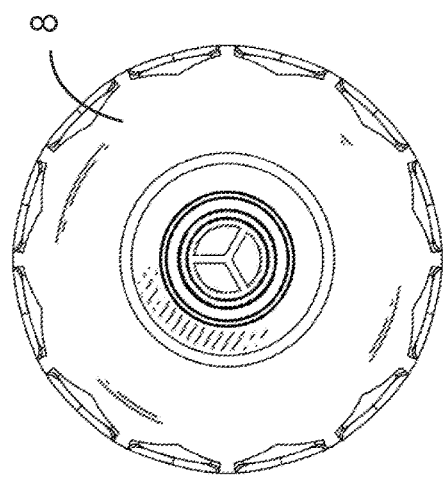
FIG. 4 is a bottom view of the bottle top liquid infusion system of the present invention.
Figure 2:
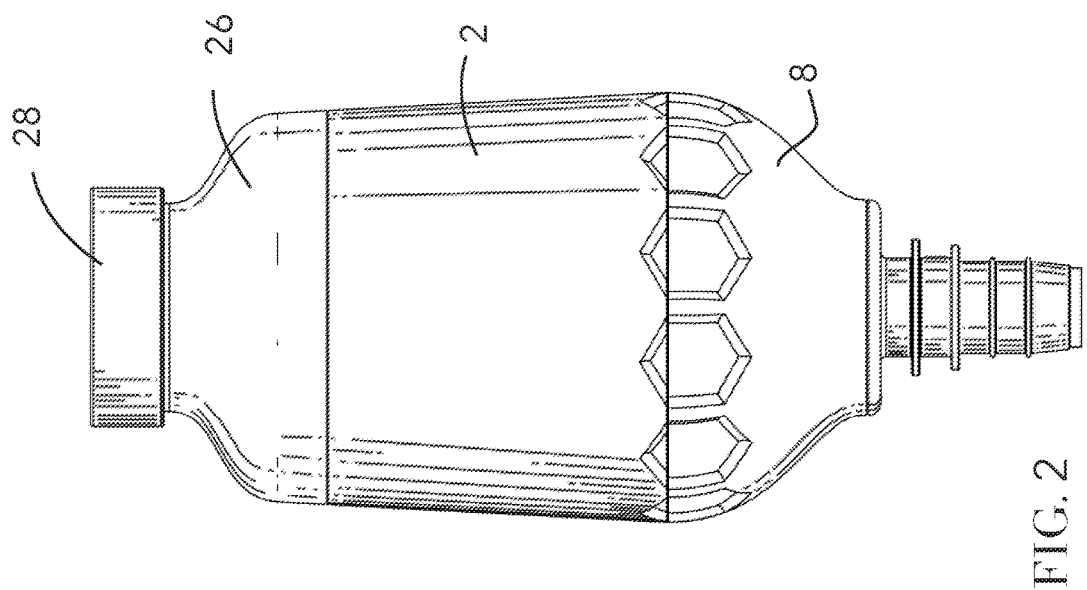
FIG. 2 is an elevation view of the bottle top liquid infusion system of the present invention.
Figure 5:
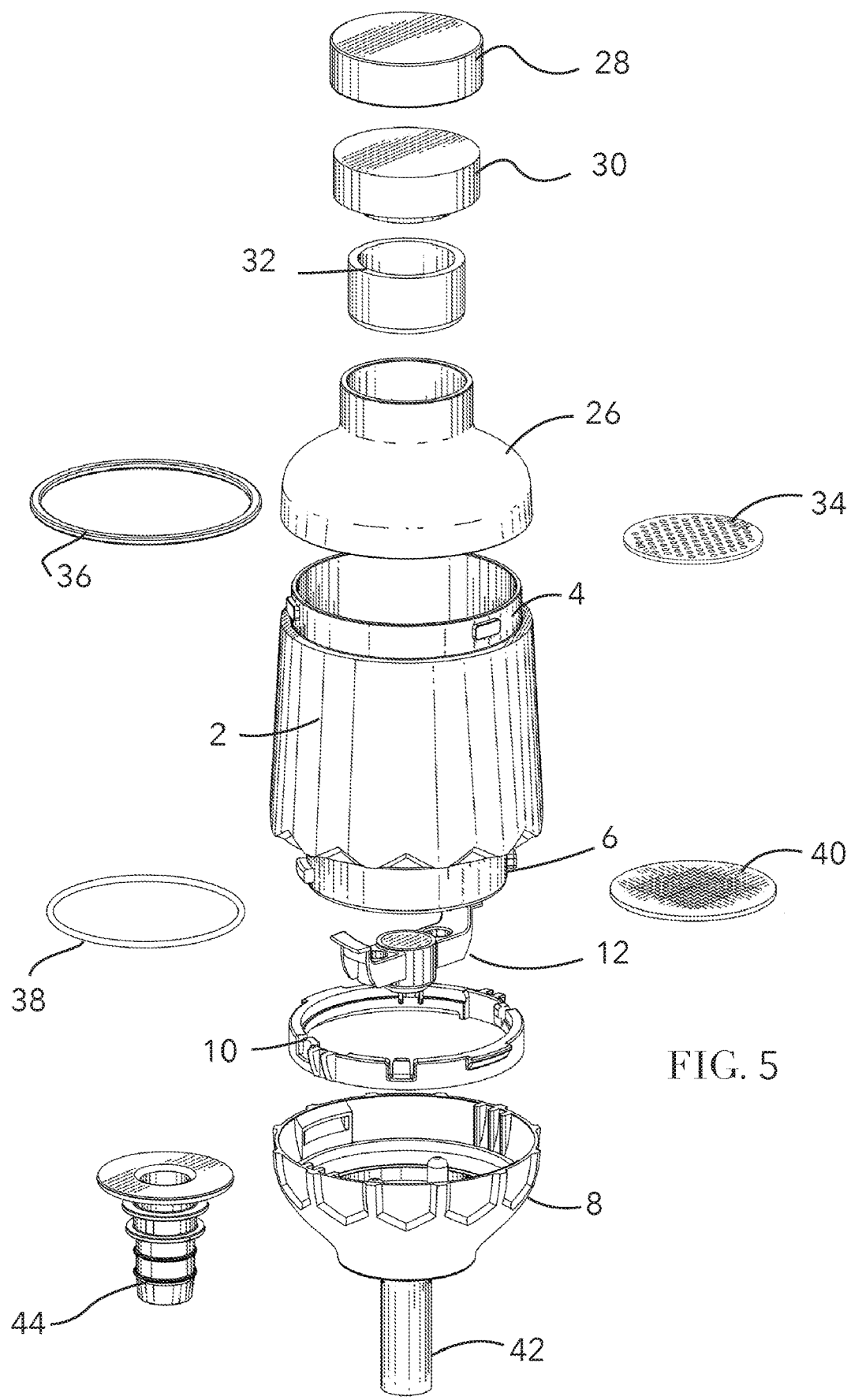
FIG. 5 is an exploded view of the components of the bottle top liquid infusion system of the present invention.

The liquid infusion system 1 of the present invention comprises infusion chamber 2 having top end 4 and bottom end 6. Lower housing 8 is rotatably connected to infusion chamber 2 by means of locking ring 10 attached within the lower housing.

Valve means, in the form of one-way directional valve 12, is positioned within lower housing 8. Valve 12 comprises weighted central valve housing 14. A weighted ballast material, e.g. metal, is located within central valve housing 14. Arm members 18 and 20 extend outwardly from central valve housing 14. Upstanding support members 19 and 21 in lower housing 8 maintain valve 12 within the lower housing.

Figure 6:
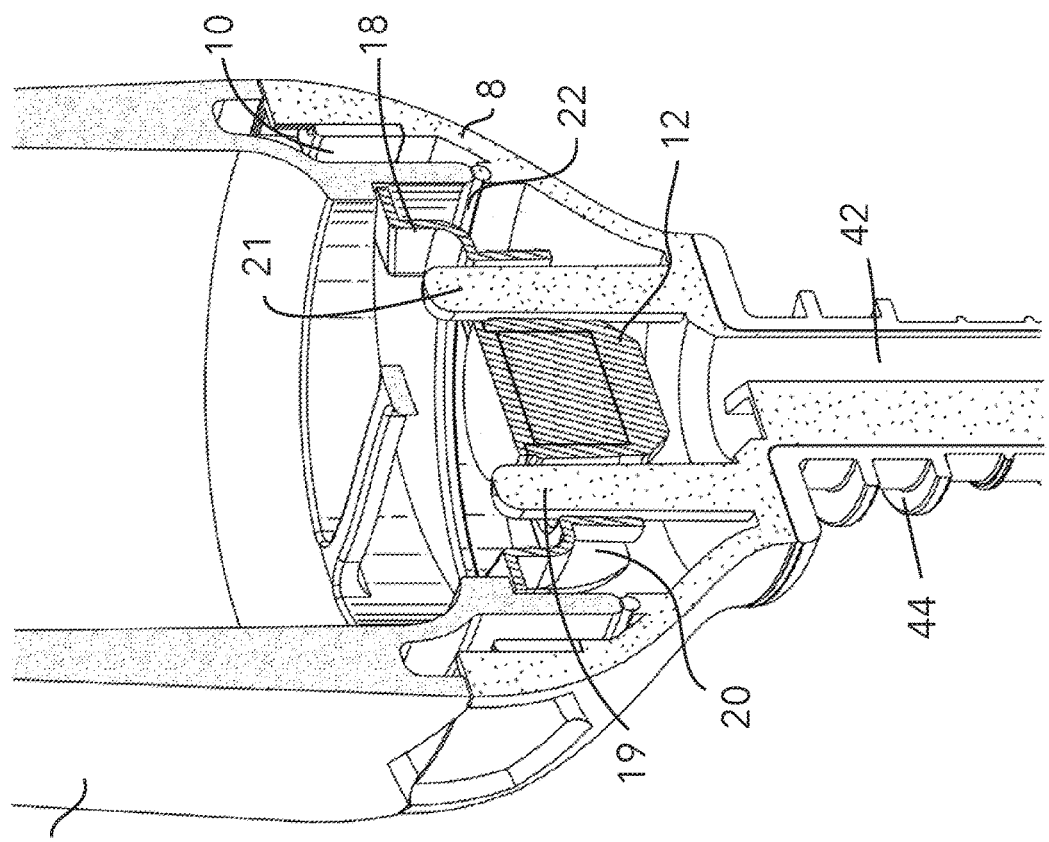
FIG. 6 is a partial sectional view of the one-way directional valve located in the lower housing of the bottle top liquid infusion system of the present invention with the valve in the closed position.
Figure 7:
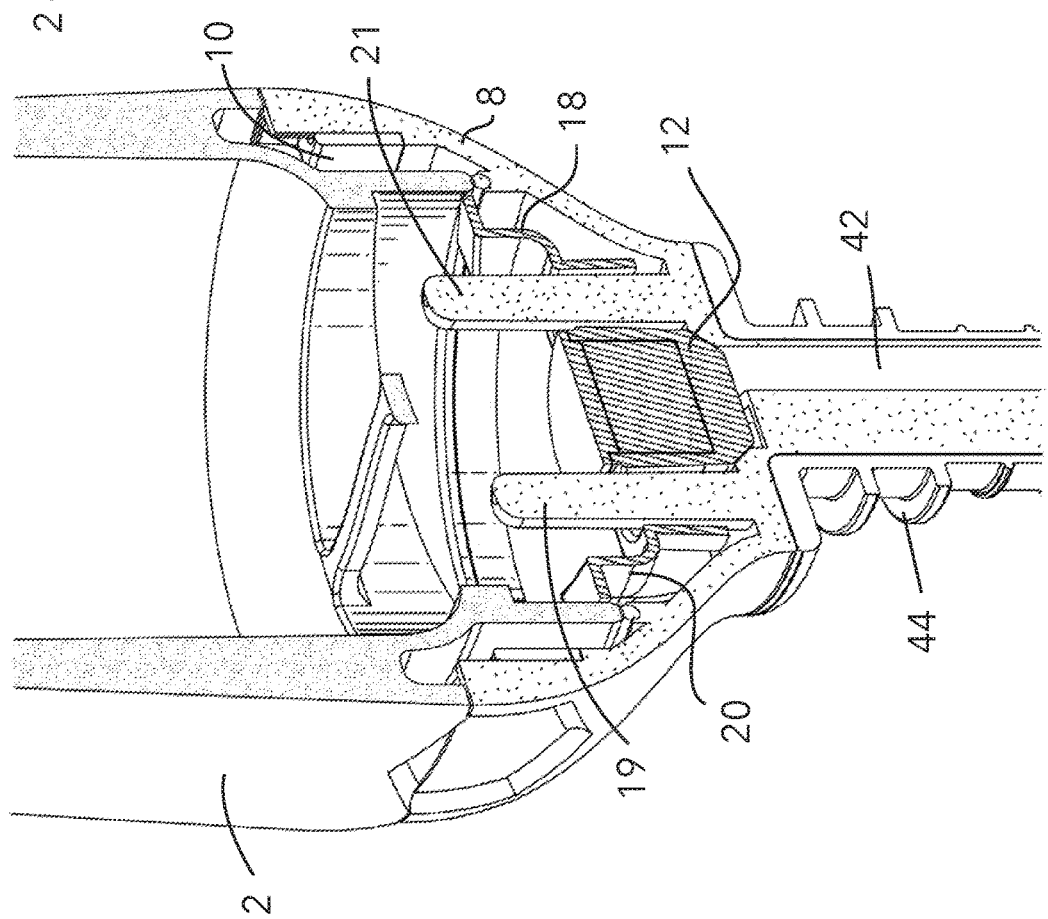
FIG. 7 is a partial sectional view of the one-way directional valve in the lower housing of the bottle top liquid infusion system of the present invention with the valve in the open position.
Figure 9:
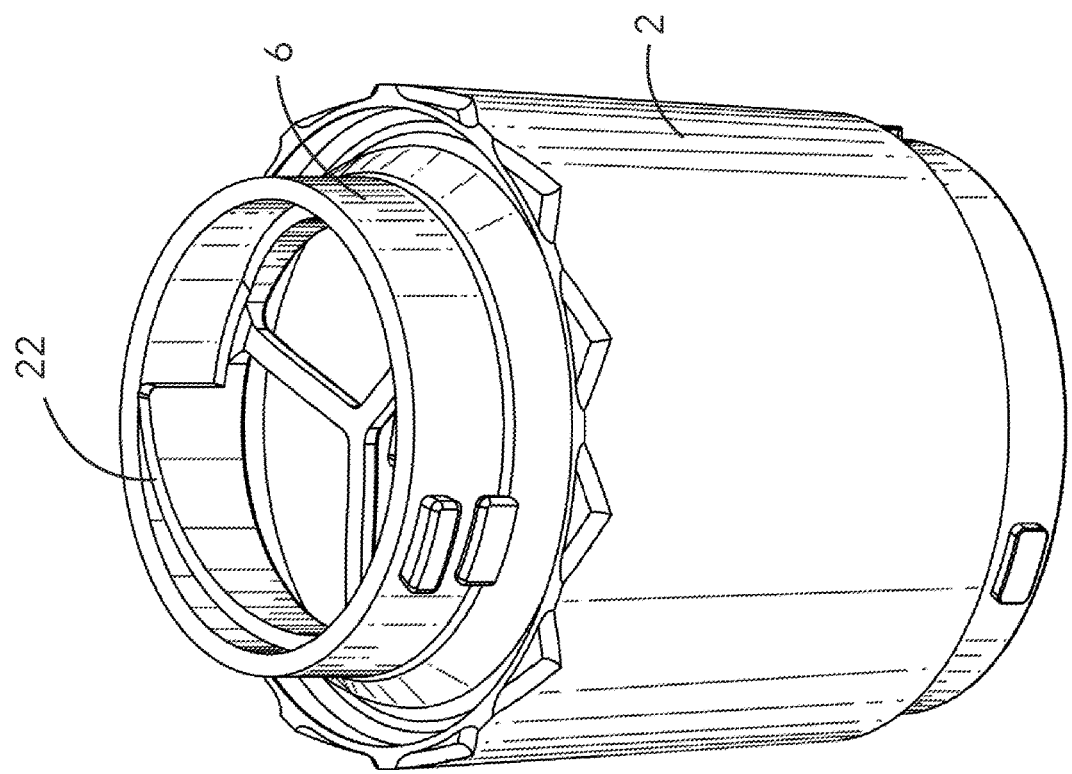
FIG. 9 is a perspective bottom view of the infusion chamber of the bottle top liquid infusion system of the present invention.
Figure 8:
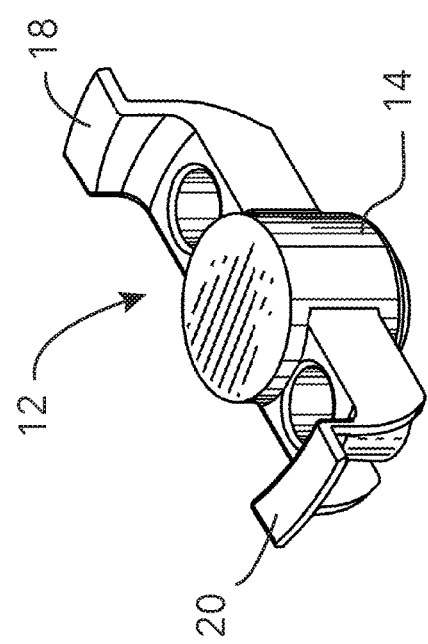
FIG. 8 is a view of the one-directional valve of the bottle top liquid infusion system of the present invention.
Figure 11:
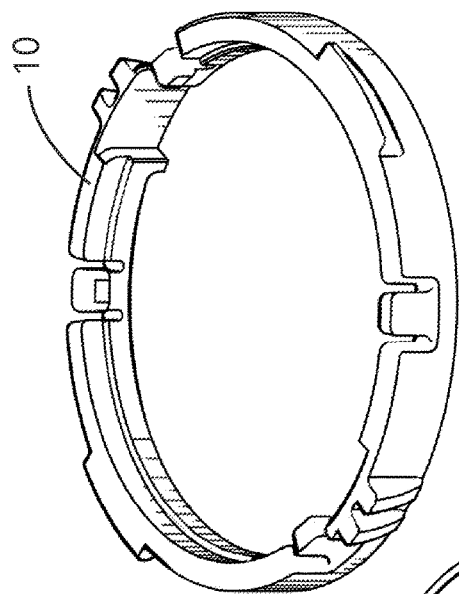
FIG. 11 is a perspective view of the locking ring of the bottle top liquid infusion system of the present invention.
Figure 10:
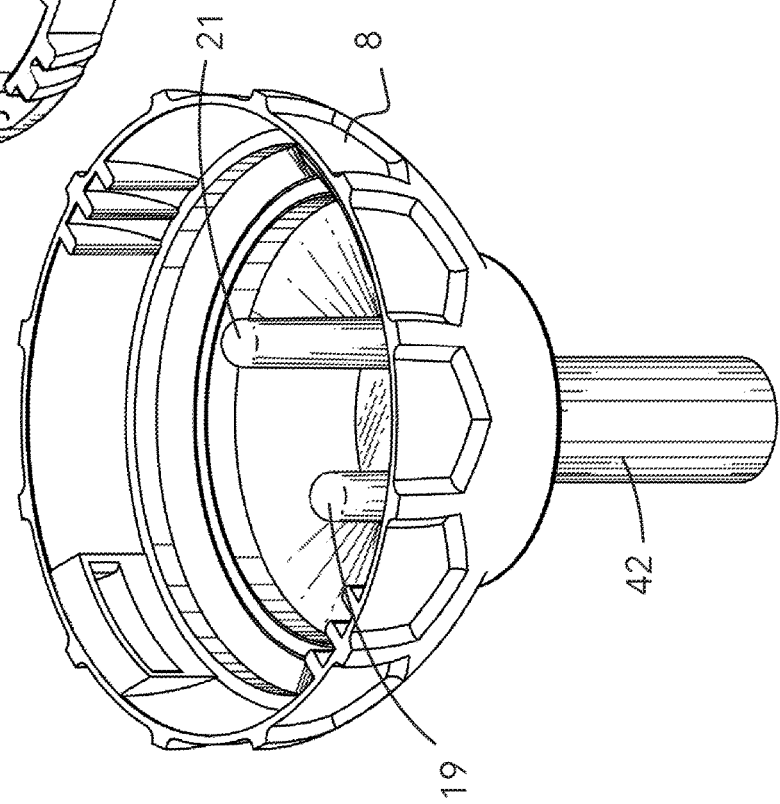
FIG. 10 is a top perspective view of the lower housing of the bottle top liquid infusion system of the present invention.

Ramp 22 is located at bottom end 6 of infusion chamber 2. In a first position, infusion chamber 2 and lower housing 8 are aligned in relation to each other such that there is open access between the chamber and the housing. In this position, arm members 18 and 20 rest on ramp 22 when valve 12 is closed. FIG. 6. Valve 12 is open when arm members 18 and 20 are located above ramp 22. FIG. 7. As a result, in this first position, valve 12 is free to move up (to the open position) and down (to the closed position). However, when lower housing 8 is turned and rotated to a second position in relation to infusion chamber 2, locking ring 10 attached to the lower housing maintains valve 12 in a closed position in order to seal off access between the lower housing and the infusion chamber.

Cover means, in the form of upper housing 26, decorative outer cap 28, and sealer inner cap 30, are connected to top end 4 of infusion chamber 2. Rubber stopper 32 and perforated filter 34 are located within upper housing 26. Silicone or equivalent material gaskets 36 and 38 assist in providing water-proof seals between upper housing 26 and infusion chamber 2, and lower housing 8 and the infusion chamber 2. Woven mesh 40 within infusion chamber 2 provides additional filtering.

Liquid passage means, in the form of tubular liquid pourer 42 positioned within silicone or equivalent stopper 44, extends from lower housing 8.

FIGS. 12-17 illustrate the use of the liquid infusion system 1 of the present invention. Caps 28 and 30 are removed from upper housing 26 to open infusion chamber 2. FIG. 12. Infusion chamber 2 is then filled with the flavored food ingredients 60 desired by the user. FIG. 13. Cap 30 is reattached to upper housing 26. Infusion chamber 2 is turned and rotated in relation to lower housing 8 to the first position in which valve 12 and its arm members 18 and 20 are free to move on and off ramp 22, allowing the valve to move up and down, depending on the orientation of liquid infusion system 1.

Liquid pourer 42 and stopper 44 are inserted into the neck 62 of bottle 64 containing virgin liquid, e.g. water 66. Liquid infusion systems 1 is then tilted downward, allowing virgin liquid to flow through an open valve 12 into infusion chamber 2. FIG. 14.

After the desired amount of virgin liquid 66 has entered infusion chamber 2, liquid infusion system 1 is then tilted back upward, into a vertical position over bottle 64, where the infused flavored ingredients are permitted to step for a preferred period of time. FIG. 15. During this period of time, one-way directional valve 12 moves down to prevent the liquid within infusion chamber 2 from flowing back into bottle 64.

Once the liquid infusion process has been completed, liquid infusion chamber 2 is turned and rotated to the second position in relation to lower housing 8, the locking ring 10 in the lower housing causing arm members 18 and 20 to travel down ramp 22 in order to maintain valve 12 in the closed position. This prevents the flow of any liquid between bottle 64 and infusion chamber 2. FIG. 16. Cap 30 is detached from upper housing 26 and the infused liquid 68 is poured into glass 70 for consumption. See FIG. 17.

It is contemplated that the ingredients used in the herein description are not to be considered those restricted for use in infusion system 1. The system can accept any type of flavored ingredients, such as fruit, vegetables, spices, different flavorings, herbs, alcoholic beverages, or any foodstuffs of choice. The virgin liquid can be a liquid other than water.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A liquid infusion system comprising:
an infusion chamber having an open top end and an open bottom end;
cover means removeably connected to the top end for providing a water-proof seal closure of the top end;
a lower housing rotatably secured to the bottom end of the infusion chamber, said housing being rotatable from a first position in relation to the infusion chamber to a second position in relation to the infusion chamber;
valve means located within the lower housing for allowing liquid flow in only a single direction; and
liquid passage means connected to the lower housing for directing the flow of liquid into the lower housing, whereby when the lower housing is rotated into said first position in relation to the infusion chamber, liquid is free to flow in said single direction from the liquid passage means and through the valve means to the infusion chamber, and when the lower housing is rotated into said second position in relation to the infusion chamber, the valve means prevents the flow of liquid between the lower housing and the infusion chamber.

2. An infusion chamber system as in claim 1 wherein the valve means comprises a central valve housing containing weighted ballast material and dual arm members outwardly extending from the valve housing.

3. The liquid infusion system as in claim 2 wherein the bottom end of the infusion chamber comprises a ramp, whereby when the lower housing is rotated into said first position, the arm members are free to move off the ramp to open the valve means to allow liquid to flow in said single direction and on the ramp to close the valve means, and when the lower housing is rotated into said second position, the arm members travel along the ramp to close the valve means to prevent the flow of liquid between the lower housing and the infusion chamber.

4. The liquid infusion system as in claim 1 wherein the liquid passage means comprises a spout adapted to be inserted into a liquid containing bottle.

5. The liquid infusion system as in claim 1 wherein the cover means comprises an upper housing removeably connected to the top end of the infusion chamber, and a cap removeably connected to the upper housing.

* * * * *